US006859019B2

(12) United States Patent
Tornquist et al.

(10) Patent No.: US 6,859,019 B2
(45) Date of Patent: Feb. 22, 2005

(54) SYSTEM AND METHOD FOR COUPLING RECTIFIERS OF AN EXCITER TO THE ROTOR OF A MAIN GENERATOR

(75) Inventors: Gerald E. Tornquist, Tucson, AZ (US); Raymond W. Borden, Farmingdale, NJ (US); James D. Lengel, Oro Valley, AZ (US); Ming Xu, Tucson, AZ (US); Kieran P. J. Doherty, Oro Valley, AZ (US); Gregor J. S. McDowall, Tucson, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/943,565

(22) Filed: Aug. 30, 2001

(65) Prior Publication Data

US 2003/0042810 A1 Mar. 6, 2003

(51) Int. Cl.[7] .................................................. H02P 9/14
(52) U.S. Cl. .............................. 322/68; 322/69; 322/27; 322/28; 322/24
(58) Field of Search ............................ 322/68, 69, 27, 322/28, 24

(56) References Cited

U.S. PATENT DOCUMENTS

| | | |
|---|---|---|
| 3,355,610 A | 11/1967 | Staff |
| 3,558,950 A | 1/1971 | Raybould |
| 3,590,301 A | 6/1971 | Woydt |
| 3,596,120 A | 7/1971 | Potter |
| 3,639,794 A | 2/1972 | Karpman et al. |
| 3,659,129 A | 4/1972 | Pettersen |
| 3,858,069 A | 12/1974 | Kuter et al. |
| 3,922,114 A | 11/1975 | Hamilton et al. |
| 3,924,149 A | 12/1975 | Estrada et al. |
| 4,037,126 A | 7/1977 | Brennan et al. |
| 4,068,142 A | 1/1978 | Gillet et al. |
| 4,252,035 A | 2/1981 | Cordner et al. |
| 4,281,973 A | 8/1981 | Meneghello |
| 4,471,250 A | 9/1984 | Snider |
| 4,510,679 A | 4/1985 | Aleem et al. |
| 4,562,641 A | 1/1986 | Mosher et al. |
| 4,564,777 A | 1/1986 | Senoo et al. |
| 4,588,914 A | 5/1986 | Heyne |
| 4,591,749 A | 5/1986 | Gauthier et al. |
| 4,598,218 A | 7/1986 | Aleem et al. |
| 4,603,274 A | 7/1986 | Mosher |
| 4,614,888 A | 9/1986 | Mosher et al. |
| 4,625,133 A | 11/1986 | Lobsinger et al. |
| 4,644,210 A | 2/1987 | Meisner et al. |

(List continued on next page.)

FOREIGN PATENT DOCUMENTS

| | | | | |
|---|---|---|---|---|
| GB | 2293 704 | * | 4/1996 | ............ H02H/7/06 |
| WO | 02/27753 | | 12/2002 | |

*Primary Examiner*—Nicholas Ponomarenko
*Assistant Examiner*—Iraj A. Mohandesi
(74) *Attorney, Agent, or Firm*—Douglas A. Mullen, Esq.

(57) ABSTRACT

A system and method for electrically coupling windings of a main generator rotor to a plurality of DC sources on an exciter that each have respective first-voltage and second-voltage terminals is disclosed. The system includes first and second conductive plates supported by the rotor that respectively define first and second apertures that surround a rotor shaft. The first plate includes a first rotor winding terminal by which the plate is electrically coupled to the windings, and a first plurality of terminals configured to be respectively coupled to the first-voltage terminals of the DC sources. The second plate is electrically insulated from the first plate, includes a second rotor winding terminal by which the second plate is electrically coupled to the windings, and includes a second plurality of terminals configured to be respectively coupled to the second-voltage terminals of the DC sources.

19 Claims, 5 Drawing Sheets

U.S. PATENT DOCUMENTS

| | | |
|---|---|---|
| 4,647,806 A | 3/1987 | Giuffrida |
| 4,781,669 A | 11/1988 | Piramoon |
| 4,862,581 A | 9/1989 | Royer |
| 4,864,175 A | 9/1989 | Rossi |
| 4,943,746 A | 7/1990 | Scherzinger et al. |
| 4,990,807 A | 2/1991 | Flygare et al. |
| 5,086,246 A | 2/1992 | Dymond et al. |
| 5,122,704 A | 6/1992 | Blakeley et al. |
| 5,136,195 A | 8/1992 | Allen, III et al. |
| 5,140,204 A | 8/1992 | Cashmore et al. |
| 5,177,390 A | 1/1993 | Van Maaren |
| 5,191,256 A | 3/1993 | Reiter, Jr. et al. |
| 5,237,227 A | 8/1993 | Huss |
| 5,298,823 A | 3/1994 | Johnsen |
| 5,323,080 A | 6/1994 | Shahamat et al. |
| 5,325,009 A | 6/1994 | Capion et al. |
| 5,394,043 A | 2/1995 | Hsia |
| 5,495,133 A | 2/1996 | Bawin et al. |
| 5,587,616 A | 12/1996 | Johnsen |
| 5,666,016 A | 9/1997 | Cooper |
| 5,737,210 A | 4/1998 | Barahia |
| 5,763,976 A | 6/1998 | Huard |
| 5,796,196 A | 8/1998 | Johnsen et al. |
| 5,798,593 A | 8/1998 | Salter et al. |
| 5,850,138 A * | 12/1998 | Adams ......................... 322/68 |
| 5,955,811 A | 9/1999 | Chiba et al. |
| 6,113,024 A | 9/2000 | Pittard et al. |
| 6,153,957 A * | 11/2000 | Takano ........................ 310/71 |
| 6,157,109 A | 12/2000 | Schiferl et al. |
| 6,190,258 B1 | 2/2001 | Heidenreich et al. |
| 6,194,807 B1 | 2/2001 | Kaminski et al. |

\* cited by examiner

FIG. 5

SYSTEM AND METHOD FOR COUPLING RECTIFIERS OF AN EXCITER TO THE ROTOR OF A MAIN GENERATOR

FIELD OF THE INVENTION

The present invention relates to high speed generators and, more particularly, to systems and methods for electrically coupling moving components on the rotors of such generators to other devices, such as aircraft systems.

BACKGROUND OF THE INVENTION

Generator systems that are installed in aircraft may include three separate brushless generators, namely, a permanent magnet generator (PMG), an exciter, and a main generator. The PMG includes permanent magnets on its rotor. When the PMG rotates, AC currents are induced in stator windings of the PMG. These AC currents are typically fed to a regulator or a control device, which in turn outputs a DC current. This DC current next is provided to stator windings of the exciter. As the rotor of the exciter rotates, three phases of AC current are typically induced in the rotor windings. Rectifier circuits that rotate with the rotor of the exciter rectify this three-phase AC current, and the resulting DC currents are provided to the rotor windings of the main generator. Finally, as the rotor of the main generator rotates, three phases of AC current are typically induced in its stator windings, and this three-phase AC output can then be provided to a load such as, for example, electrical aircraft systems.

Because the generators installed in aircraft will often be variable frequency generators that rotate in the speed range of 12,000 rpm to 24,000 rpm, large centrifugal forces are imposed upon the rotors of the generators. Consequently, the rotors should be robust enough to tolerate such forces over long periods of time, and also be precisely balanced to minimize inefficiencies and the risk of failures associated with improper balancing. Designs that strictly define the positioning and allowable tolerances of components within the generator rotors are therefore important, and manufacturing processes for the assembly of components likewise should be performed within rigorously predefined tolerances.

Several aircraft generator components are employed to provide DC current from the rectifier circuits of the exciter to the rotor windings of the main generator. The exciter itself typically provides three phases of AC current that should be independently rectified by respective rectifier circuits and then provided to the rotor windings. In one conventional system, three sets of electrical connections between the rectifier circuits and the rotor windings allow current to pass therebetween. These electrical connections between the rotor windings and the rectifier circuits are provided merely by extending the wire windings from the rotor directly to the rectifier circuits.

This conventional system has certain drawbacks that reduce the overall reliability and balancing of the generators. In particular, because the connections between the rectifier circuits and the rotor of the main generator are provided by wires, the wire connections over time can become weakened or even break due to the repeated application of strong centrifugal forces. Although in certain embodiments the wire extensions may be secured by glue or another fastener to the central shaft of the rotor, the process of securing the wire extensions during manufacturing of the rotor can be laborious and/or imprecise, potentially leading to improperly-balanced rotors. Further, it may be the case that only certain portions of the wire extensions are actually secured, while other portions of the wire extensions remain free to move and bend as the generator rotates. This tends to reduce the reliability of the rotors and can also lead to improper balancing of the rotors.

Thus, there is a need for a high-speed generator with an improved coupling to connect the DC power output from the rectifier circuits of the exciters with the rotor windings of the main generators in order to provide improved balance and/or improved reliability and/or more convenient manufacture of the generator. The present invention fulfills this need and provides one or more of the foregoing advantages.

SUMMARY OF THE INVENTION

The present inventors have recognized that the rotor windings can be coupled to conductive rings that are fixed with respect to the rotor instead of being coupled directly to each of the individual rectifier circuits. The conductive rings can in turn be designed to include fixed terminals that interface directly with the rectifier circuits at the positions at which those circuits are located. By employing fixed conductive rings that interface with rectifier circuits at the particular locations at those circuits, the positional variability associated with wire extensions is eliminated so that the rotor has greater robustness and less likelihood of being or becoming improperly balanced. Additionally, the conductive rings are simple to manufacture and easy to install onto the remainder of the rotor.

In particular, the present invention relates to a system in a generator assembly having an exciter and a main generator with a rotor, where the system is on the rotor and is for electrically coupling windings of the rotor to a plurality of DC sources on the exciter, and where each of the DC sources has a respective first-voltage terminal and a respective second-voltage terminal. The system includes a first conductive plate defining a first aperture and a second conductive plate defining a second aperture. The first conductive plate is supported by the rotor, includes a first rotor winding terminal by which the first conductive plate is electrically coupled to the windings, and includes a first plurality of terminals configured to be respectively coupled to the first-voltage terminals of the DC sources. The second conductive plate, which is supported by the rotor and is electrically insulated from the first conductive plate, includes a second rotor winding terminal by which the second conductive plate is electrically coupled to the windings, and includes a second plurality of terminals configured to be respectively coupled to the second-voltage terminals of the DC sources. Each of the first and second conductive plates is supported by the rotor so that each of the first and second apertures surround a shaft of the rotor.

The present invention further relates to a system for electrically coupling a plurality of electrical devices on a first rotating machine component with a single electrical device on a second rotating machine component, where the first and second rotating machine components are in axial alignment and rotate at the same speed, and where each of the plurality of electrical devices and the single electrical device includes a respective first terminal and a respective second terminal. The system includes a first means for electrically coupling the first terminal of the single electrical device with the first terminals of the plurality of electrical devices, a second means for electrically coupling the second terminal of the single electrical device with the second terminals of the plurality of electrical devices, and a third means for insulating the first means from the second means. The first, second and third means are supported by at least one of the first and second rotating machine components.

The present invention additionally relates to a method of coupling a plurality of rectifier circuits of an exciter with windings of a rotor of a main generator in a generator assembly so that DC power can be provided from the rectifier circuits to the windings. The method includes coupling a plate assembly onto the rotor, where the plate assembly includes at least a first conductive plate and a second conductive plate separated from one another by an insulating layer, and where the first and second conductive plates respectively define first and second apertures so that the first and second conductive plates can be positioned around a shaft of the rotor. The method further includes coupling the windings to a first terminal of the first conductive plate and also to a second terminal of the second conductive plate, and positioning the exciter in proximity to the rotor. The method additionally includes coupling a respective first-voltage terminal of each of the rectifier circuits to a corresponding terminal on the first conductive plate, and coupling a respective second voltage terminal of each of the rectifier circuits to a corresponding terminal on the second conductive plate.

The present invention further relates to a generator assembly including an exciter, a shaft and a main generator. The exciter includes an exciter stator and an exciter rotor. The exciter rotor includes a plurality of DC sources each having a respective first-voltage terminal and a respective second-voltage terminal. The main generator includes a main stator and a main rotor with windings, and the exciter rotor and the main rotor are coupled by the shaft. The main rotor includes a first conductive plate defining a first aperture and a second conductive plate defining a second aperture. The first conductive plate is supported by the main rotor and includes a first rotor winding terminal by which the first conductive plate is electrically coupled to the windings and also a first plurality of terminals configured to be respectively coupled to the first-voltage terminals of the DC sources. The second conductive plate is supported by the rotor and electrically insulated from the first conductive plate. The second conductive plate includes a second rotor winding terminal by which the second conductive plate is electrically coupled to the windings, and a second plurality of terminals configured to be respectively coupled to the second-voltage terminals of the DC sources.

Other features and advantages of the high speed generator will become apparent from the following detailed description, taken in conjunction with the accompanying drawings, which illustrate, by way of example, the principles of the invention.

DETAILED DESCRIPTION OF THE INVENTION

Figure 1:
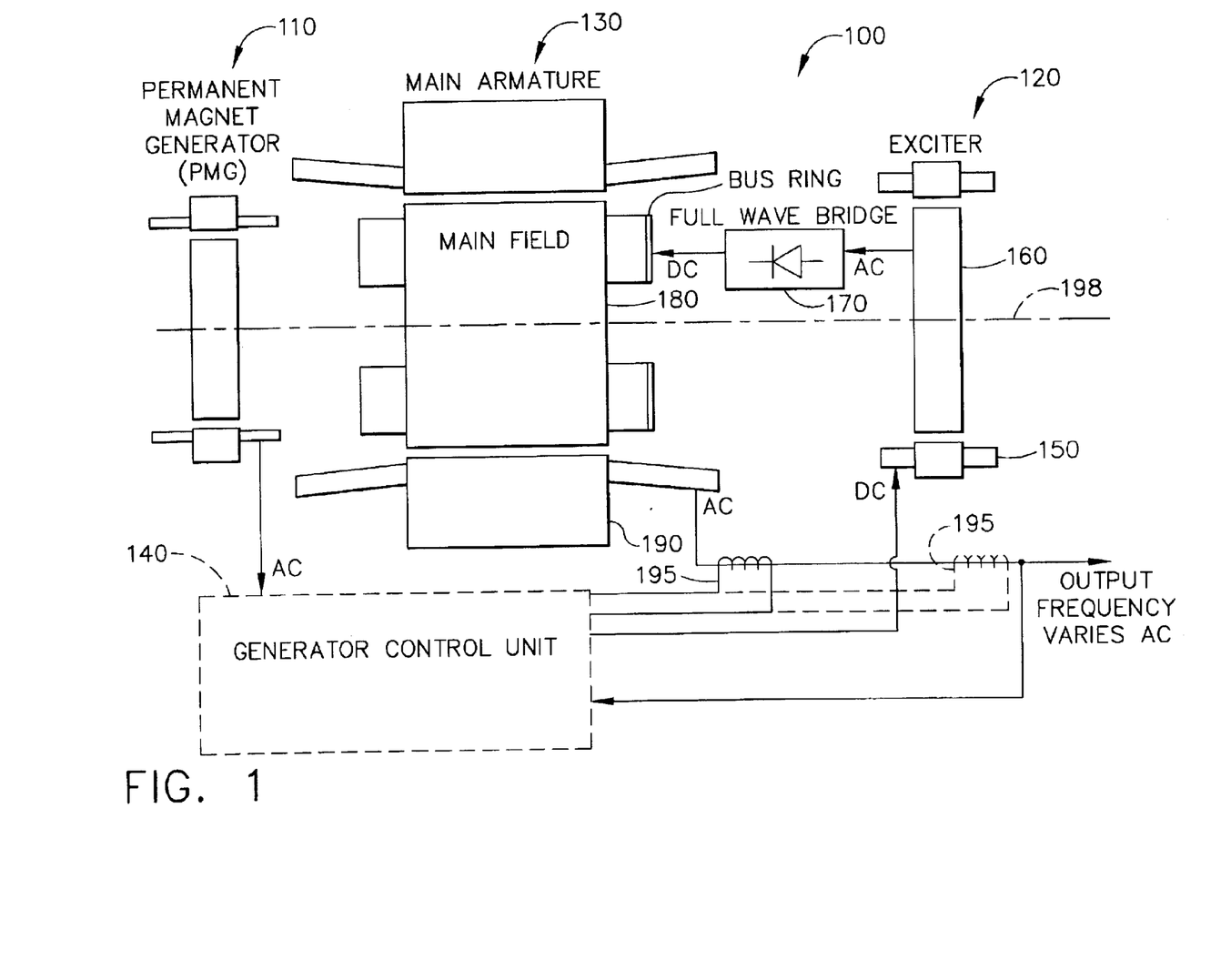
FIG. 1 is a schematic showing components of a generator system including a permanent magnet generator (PMG), an exciter, and a main generator.

Referring to FIG. 1, a schematic of an exemplary high speed generator system 100 that is commonly employed on aircraft is shown to include a permanent magnet generator (PMG) 110, an exciter 120, and a main generator 130. As shown, the PMG 110 provides alternating current (AC) power output to a generator control unit 140, which in turn provides direct current (DC) power to a stator 150 of the exciter 120. A rotor 160 of the exciter 120 in turn provides AC power to a full wave bridge rectifier 170 that typically includes one or more rectifier circuits (see FIG. 2). The output from the full wave bridge rectifier 170 is DC power and is provided to a rotor 180 of the main generator 130, which in turn outputs AC power from a stator 190.

Figure 5:
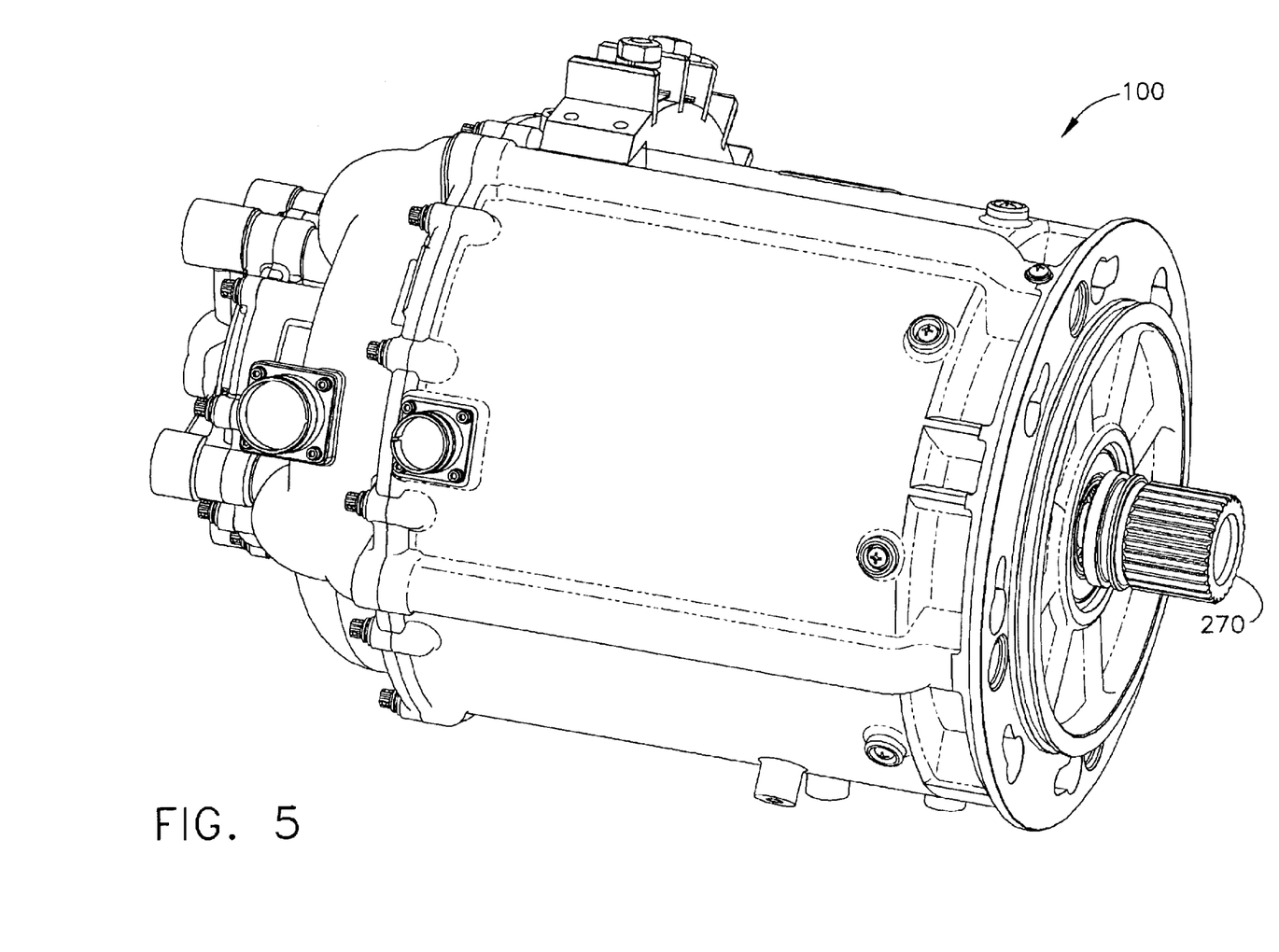
FIG. 5 is a perspective view of the generator system of FIG. 1.

The generator system 100 is typically a variable frequency generator (VFG) capable of providing output power in a variety of frequencies (e.g., in the range of 350–750 Hz). It is to be appreciated, however, that this frequency range is merely exemplary of a preferred embodiment. Further, typically the output power from the stator 190 is three-phase AC power. The generator control unit 140 can regulate the power output based upon monitoring signals provided to it from monitoring devices 195. As shown in FIG. 1, commonly the PMG 110, the exciter 120 and the main generator 130 rotate along a single axis 198 at the same rotational speed, and typically at least the exciter and the main generator do so. The relative positioning of the PMG 110, exciter 120 and main generator 130 can be modified in different embodiments such that the exciter is physically between the PMG 110 and the main generator 130. A perspective view of a physical embodiment of the generator system 100 is provided in FIG. 5.

Figure 2:
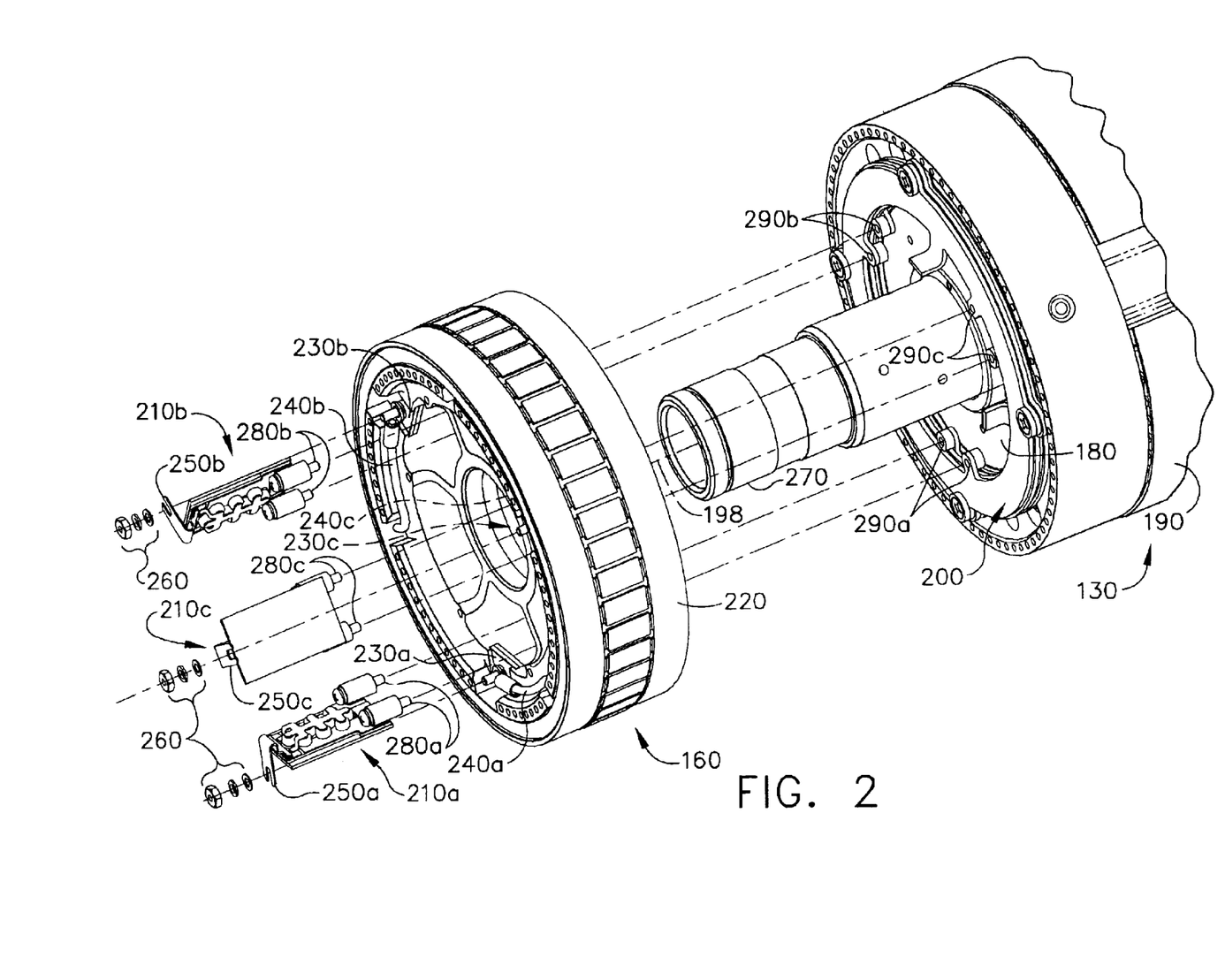
FIG. 2 is an exploded, perspective view of one embodiment of the main generator (shown in cut-away) and exciter of FIG. 1.

Turning to FIG. 2, an exploded, perspective view of one embodiment of the main generator 130 and the rotor 160 of the exciter 120 are shown. Exploded out from the rotor 160 of the exciter 120 in particular are three rectifier circuits 210a, b and c. Although the full wave bridge rectifier 170 is shown in FIG. 1, the rectifier circuits 210a–c can be any of a number of different types of rectifier circuits known to those skilled in the art, including full-wave rectifiers, half-wave rectifiers, or simply diodes, depending upon the embodiment. The rotor 160 includes windings 220 that provide three phases of AC power to flat connector plates 230a, b and c by way of respective wires 240a, b and c. Connectors 250a, b and c of the rectifier circuits 210a, b and c fit, respectively, onto the flat connector plates 230a–c so that the rectifier circuits can be affixed to the rotor 160 by way of locking nuts 260.

In accordance with the present invention, the main generator 130 includes a plate assembly 200 that is utilized to provide power from the rectifier circuits 210a–c to the windings (not shown) of the rotor 180 of the main generator 130. As further described with respect to FIG. 3, the plate assembly 200 in one embodiment includes four circular plates with circular apertures in them, that is, four rings, although in alternate embodiments (such as that shown in FIG. 4) the plate assembly can include differently-shaped plates. The plates of the plate assembly 200 are concentric about a shaft 270 of the rotor 180. The rotor 160 of the exciter 120 fits, upon assembly of the generator assembly 100, onto the rotor 180 such that the rotor 160 and the rotor 180 both rotate about the axis 198. Upon assembly of the rotor 160, each of the rectifier circuits 210a–c respectively extend axially (parallel to the axis 198) through the rotor so that respective pairs of terminals 280a, b and c on the rectifier circuits 210a, b and c contact the plate assembly 200.

Specifically, the plate assembly 200 includes three pairs of terminals 290a, b and c (discussed further with respect to FIG. 3) that are designed to contact the terminals 280a, b and c, respectively and therefore receive DC power from the rectifier circuits 210a, b and c. Because each of the three phases of AC power provided at the rotor 160 to the rectifier circuits 210a–c are rectified into DC power, the output power from all of the rectifier circuits is provided to the same plate assembly 200. However, each of the pairs of terminals 280a–c of the respective rectifier circuits 210a–c includes a first terminal that is at a first (e.g., high) voltage potential and a second terminal that is at a second (e.g., low) voltage potential. Thus, each of the pairs of terminals 290a–c of the plate assembly 200 includes a first terminal that is designed to receive DC power at the first voltage potential, and a second terminal that is designed to receive DC power at the second voltage potential.

Figure 3:
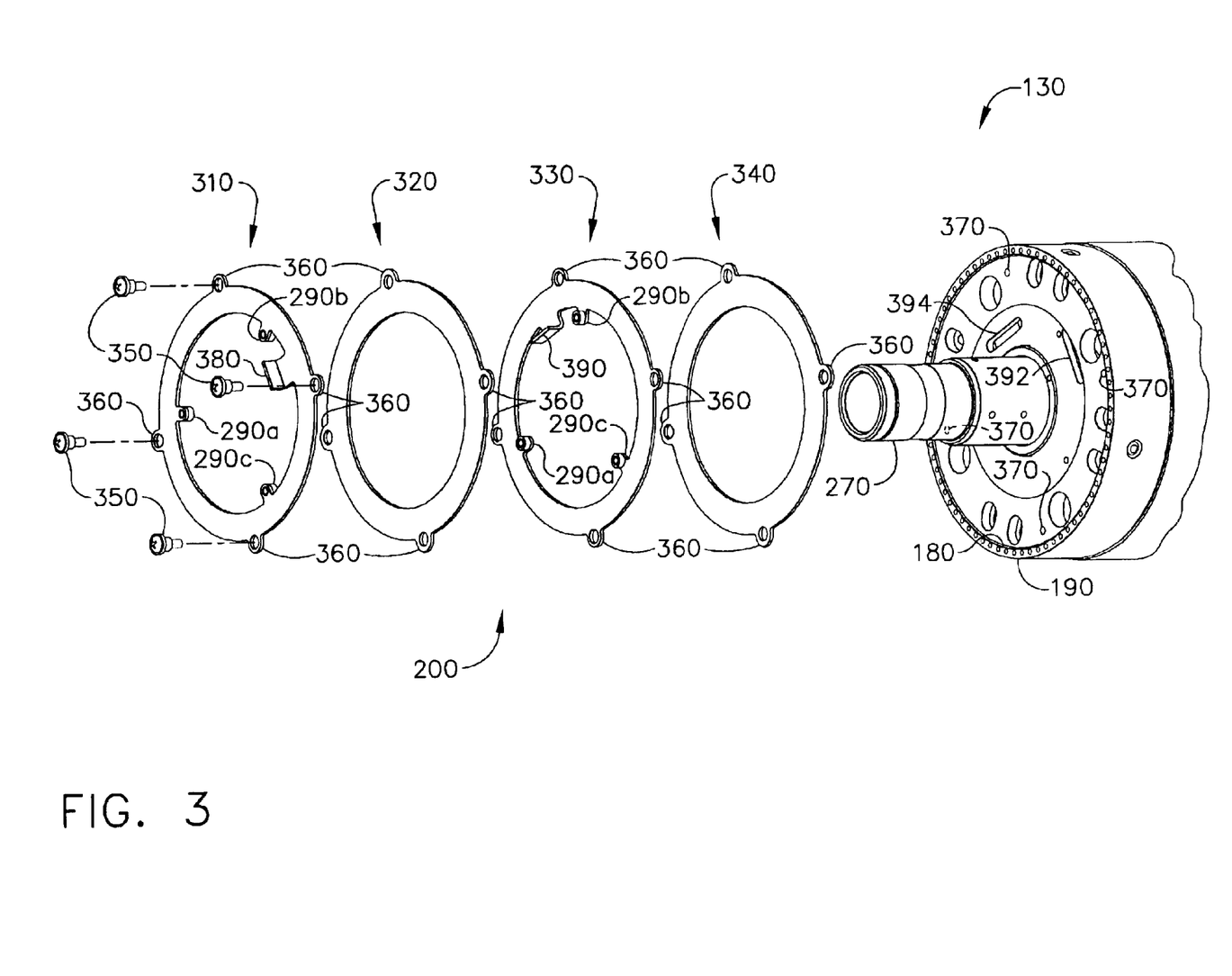
FIG. 3 is an exploded, perspective view of the main generator (shown in cut-away) of FIG. 1 and a plate assembly to be employed on the main generator in accordance with one embodiment of the present invention.

Referring to FIG. 3, the main generator 130 is again shown and the plate assembly 200 in particular is shown in an exploded view. As shown, the plate assembly in this embodiment includes four rings 310, 320, 330 and 340, which can be termed bus rings. The first and third rings, namely rings 310 and 330, are made of a conductive material such as copper, while the second and fourth rings, namely rings 320 and 340, are made of an insulating or dielectric material, which is preferably capable of sustaining high temperatures. The four rings 310–340 preferably are preassembled together using an adhesive or other fastening mechanism, and then are affixed to the rotor 180 (specifically to the rotor's end cap) by way of insulating screws 350, which fit into respective holes 360 on the plates and into holes 370 on the rotor.

Each of the conductive plates 310, 330 include three terminals 290a–c for contacting the rectifier circuits 210a–c. Specifically, the terminals 290a–c located on the first conductive ring 310 are intended to contact those of the terminals 280a–c that are at the first voltage potential, while the terminals 290a–c on the third ring 330 are intended to contact those of the terminals 280a–c that are at the second voltage potential. Thus, each of the terminals 280a–c of the rectifier circuits 210a–c that are at the first voltage potential contact the first ring 310 causing that ring to attain the first voltage potential, while each of the terminals 280a–c that are at the second voltage potential contact the third ring 330 causing that ring to attain the second voltage potential.

The first ring 310 additionally has a first rotor winding terminal 380 that is designed to be coupled to the rotor windings (not shown) of the rotor 180, while the third ring 330 additionally has a second rotor winding terminal 390 by which that conductive ring is coupled to an opposite end or ends of the rotor windings. Thus, the voltage differential between the first and third plates is also provided across the rotor windings such that DC current flows through the rotor windings. The rotor windings are coupled to the terminals 380, 390 by wiring leads or tabs 392 and 394, respectively. Given the voltage differential between the first and third rings 310 and 330, the second ring 320 acts to insulate the two conducting plates from one another. Additionally, the fourth plate 340 acts to insulate the third ring 330 from the remainder of the rotor 180.

In FIG. 3, the terminals 290a–c are shown to be threaded terminals having round indentations or holes into which the terminals 280a–c of the rectifier circuits 210a–c can be screwed or otherwise attached. The terminals 290a–c are shown to be spaced equidistant from one another around the rings 310,330, both to conform to the spacing of the rectifier circuits 210a–c and for balancing purposes (although in alternate embodiments, the terminals can be spaced differently). Also in the present embodiment, the thickness of the rings 310–340 is narrow such that the overall thickness of the plate assembly 200 is small. Consequently, the terminals 290a–c of the third ring 330 need not be bent or otherwise extended so that those terminals are at the same axial position as the terminals 290a–c of the first ring 310. However, in alternate embodiments, the shapes or sizes of the terminals 290a–c can vary from those shown. Likewise, the first and second rotor winding terminals 380, 390 are shown in the present embodiment to be L brackets and to be approximately the same size and shape as one another, although in alternate embodiments the size and shape of these terminals can be varied from that shown. The leads 392, 394 can be attached to the terminals 380, 390 by any one of a variety of methods known to those skilled in the art, including by using adhesive or solder (often, brazed connections are employed).

Several advantages result from the use of the plate assembly 200 in communicating DC power from the rectifier circuits 210a–c to the windings of the rotor 180. First, the rings 310–340 are rigid and robust and capable of maintaining a reliable path for the communication of power between the rectifier circuits 210 and the rotor windings even after long periods of high speed operation of the generator assembly 100. Second, because of the symmetry and robustness of the rings 310–340, the rotor 180 does not suffer from improper balancing due to the plate assembly 200. Third, because the rings 310–340 are highly regular in shape, and are thin pieces of material, the rings can be easily manufactured e.g., simply by stamping out these pieces. Usage of the plate assembly 200 introduces repeatability and inspectability into the generator assembly process. The usage of the rings 310–340 additionally helps to control unbalanced shifts of the wire windings (not shown) of the rotor 180.

Figure 4:
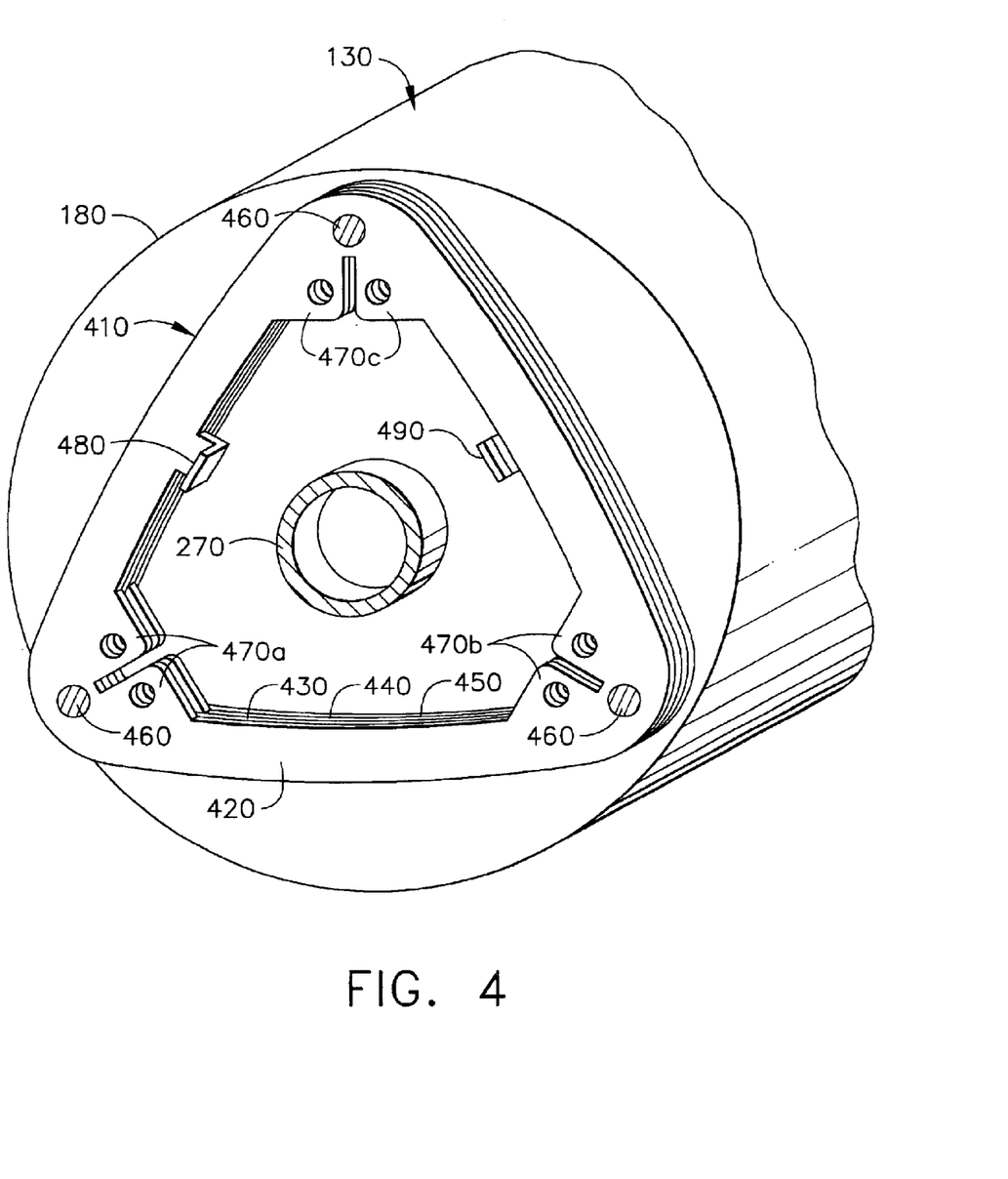
FIG. 4 is a perspective view of an alternate embodiment of the main generator of FIG. 1 incorporating a different plate assembly in accordance with another embodiment of the present invention.

Turning to FIG. 4, an alternate embodiment of the main generator 130 is shown that includes a different plate assembly 410 affixed to the rotor 180. In this embodiment, the plate assembly 410 includes first, second, third and fourth plates 420, 430, 440 and 450, respectively, each of which is substantially triangular and has a substantially triangular aperture in the middle of the respective plate so that the respective plate can be affixed around the shaft 270. The first and third plates 420, 440 are conductive while the second and fourth plates 430, 450 are made of an insulating material, and all four plates are affixed to the rotor by way of insulating screws 460. The first and third plates 420, 440 each include three tabs 470a–c that are used to connect the plates to rectifier circuits of the exciter (as shown in FIG. 2). As with respect to the plate assembly 200 of FIGS. 2 and 3, the tabs 470a–c of the first plate 420 are configured to be connected to the terminals 280a–c of the rectifier circuits 210a–c that are at the first voltage, while the tabs of the third plate 440 are configured to be connected to the terminals of the rectifier circuits that are at the second voltage. Additionally, the first and third plates 420, 440 respectively have first and second rotor winding terminals 480, 490 for coupling the respective plates to the windings (not shown) of the rotor 180. Thus, the plate assembly 410 of the embodiment of FIG. 4 is almost identical in structure and operation in comparison with the plate assembly 200 except in so far as the plate elements are substantially triangularly-shaped elements as opposed to circular rings.

A variety of alternate embodiments of the plate assembly 200 besides those shown in FIGS. 2–4 are also possible. For example, the elements of the plate assembly can have a different shape than either rings or triangles, although the shapes used should typically be symmetrical to maintain balancing of the rotor during operation. Although the plate elements of the plate assembly typically have a uniform thickness, in alternate embodiments their thickness need not be uniform (and also need not be particularly thin). Although screws such as the screws 350 and 460 can be utilized to affix the plate assembly to the rotor, in alternate embodiments other fastening mechanisms can be employed, including adhesives, to affix the plate assembly to the rotor. Additionally, although the terminals 290a–c and 470a–c are shown to be rounded, tab-like terminals with threaded holes for receiving the corresponding terminals of the rectifier circuits, in alternate embodiments other structures for allowing coupling between the rectifier circuits and the plate assembly can be used. The apertures within the plate elements need not have the same shapes as the plates themselves.

In certain embodiments, the power produced by the exciter 120 need not be three-phase power, and in such embodiments the number and type of terminals 290 and 470 can vary from three terminals. The number of poles of the rotor (a four-pole rotor is shown in FIG. 2) can also vary depending upon the embodiment, and the invention further can be employed with respect to a variety of different generators, motors, and other rotating machines. Also, the shapes and types of terminals 380, 390, 480 and 490 can vary from those shown depending upon the embodiment. Further, in certain embodiments, the insulating rings 320, 340 or plates 430, 450 can be replaced with other insulators such as insulating adhesives or films. Additionally in alternate embodiments, the fourth ring 340 or fourth plate 450 (or other insulator) are not employed since the third ring 330 or plate 440 are insulated from the rotor 180 by some other mechanism. Usage of a plate assembly such as the plate assembly 200 or plate assembly 410 is particularly effective when the plate assemblies are assembled prior to their being affixed to the rotor 180.

While the invention has been described with reference to a preferred embodiment, it will be understood by those skilled in the art that various changes may be made and equivalents may be substituted for elements thereof without departing from the scope of the invention. In addition, many modifications may be made to adapt the teachings of the invention herein to a particular situation without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. In a generator assembly having an exciter and a main generator with a rotor, a system on the rotor for electrically coupling windings of the rotor to a plurality of DC sources on the exciter, wherein each of the DC sources has a respective first-voltage terminal and a respective second-voltage terminal, the system comprising:

a first conductive plate defining a first aperture, the first conductive plate being supported by the rotor and comprising:

a first rotor winding terminal by which the first conductive plate is electrically coupled to the windings; and a first plurality of terminals configured to be respectively coupled to the first-voltage terminals of the DC sources; and a second conductive plate defining a second aperture, the second conductive plate being supported by the rotor and electrically insulated from the first conductive plate, the second conductive plate comprising:

a second rotor winding terminal by which the second conductive plate is electrically coupled to the windings; and a second plurality of terminals configured to be respectively coupled to the second-voltage terminals of the DC sources.

2. The system of claim 1, wherein the first and second conductive plates are, respectively, a first conductive ring and a second conductive ring.

3. The system of claim 2, further comprising a first insulating ring between the first conductive ring and the second conductive ring that electrically insulates the first conductive ring from the second conductive ring, wherein the first insulating ring is also supported by the rotor.

4. The system of claim 3, further comprising a second insulating ring between the first conductive ring and the rotor that electrically insulates the first conductive ring from the rotor except with respect to the windings that are electrically coupled to the first rotor winding terminal, wherein the second insulating ring is also supported by the rotor.

5. The system of claim 4, wherein the first and second conductive rings are made from metal, and the first and second insulating rings are made of a dielectric material.

6. The system of claim 4, wherein the first and second conductive rings and the first and second insulating rings are mechanically coupled to the rotor by insulating screws.

7. The system of claim 4, wherein the first conductive ring is attached with adhesive to the first and second insulating rings, and wherein the first insulating ring is further attached with adhesive to the second conductive ring.

8. The system of claim 1, wherein the first and second conductive plates are substantially triangular plates having substantially triangular apertures.

9. The system of claim 1, wherein outer perimeters of the first and second conductive plates are identical to one another and are symmetrical, and wherein the first and second apertures are identical to one another and are symmetrical.

10. The system of claim 1, wherein the first and second conductive plates have thicknesses, as measured axially along the shaft, that are identical to one another and that are constant at all locations on the plates.

11. The system of claim 1, wherein at least one of the first and second conductive plates has a thickness, as measured axially along the shaft, that varies at different locations on the at least one plate.

12. The system of claim 1, wherein the first and second rotor winding terminals are L-brackets that first protrude radially inward towards the shaft of the rotor and then protrude axially along the shaft.

13. The system of claim 12, wherein the L-brackets are coupled to the windings by brazed connections.

14. The system of claim 1, wherein each of the first plurality of terminals and each of the second plurality of terminals is a tab having a central opening for receiving a respective terminal of one of the DC power sources.

15. The system of claim 14, wherein the openings are threaded to receive the respective terminals, and wherein all of the tabs protrude radially inward inside the respective aperture toward the shaft.

16. The system of claim 14, wherein the tabs forming the first and second plurality of terminals are positioned on the first and second conductive rings so that the tabs are aligned with the terminals of the DC sources, which are at least one of diodes and rectifier circuits.

17. The system of claim 1, wherein the first plurality of terminals are spaced equidistantly around the first aperture, and second plurality of terminals are spaced equidistantly around the second aperture.

18. The system of claim 1, wherein the rotor is a four-pole rotor, the first plurality of terminals includes three terminals and the second plurality of terminals includes three terminals, so that three DC sources can be coupled by way of the first and second conductive plates to the windings.

19. A generator assembly comprising:

an exciter including an exciter stator and an exciter rotor, wherein the exciter rotor includes a plurality of DC sources each having a respective first-voltage terminal and a respective second-voltage terminal;

a shaft; and a main generator including a main stator and a main rotor with windings, wherein the exciter rotor and the main rotor are coupled by the shaft, and wherein the main rotor includes a first conductive plate defining a first aperture, the first conductive plate being supported by the main rotor and including a first rotor winding terminal by which the first conductive plate is electrically coupled to the windings, and a first plurality of terminals configured to be respectively coupled to the first-voltage terminals of the DC sources; and a second conductive plate defining a second aperture, the second conductive plate being supported by the rotor and electrically insulated from the first conductive plate, the second conductive plate including a second rotor winding terminal by which the second conductive plate is electrically coupled to the windings, and a second plurality of terminals configured to be respectively coupled to the second-voltage terminals of the DC sources.

\* \* \* \* \*